G. Brain
Imp'd Screen Guard for Cultivator Plows

PATENTED DEC 3 1867

71691

Witnesses:
Theo Tusche
Wm Spewin

Inventor
G Brain
Per Munn
Attorneys

UNITED STATES PATENT OFFICE.

G. BRAIN, OF SPRINGFIELD, OHIO.

IMPROVEMENT IN SCREEN-GUARD ATTACHMENT.

Specification forming part of Letters Patent No. 71,691, dated December 3, 1867.

*To all whom it may concern:*

Be it known that I, G. BRAIN, of Springfield, in the county of Clarke and State of Ohio, have invented a new and Improved Screen-Guard Attachment for Cultivator-Plows; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved screen-guard attachment for cultivator-plows, whereby clods of earth are prevented from being thrown upon the plants, and a greater or less quantity of fine earth thrown upon or around them, as may be required.

Figure 1:
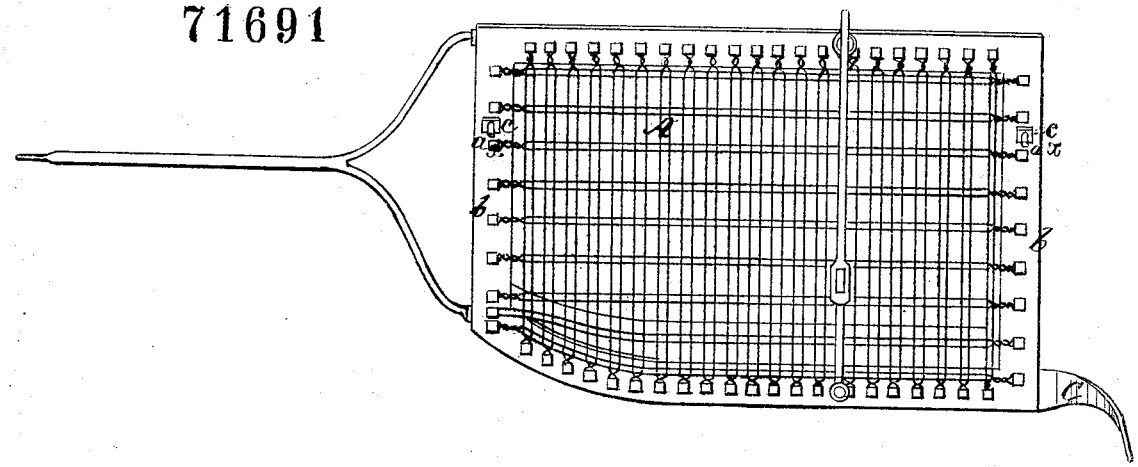
Figure 2:
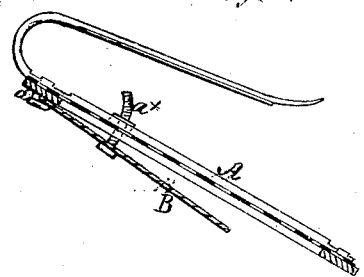
Figure 3:
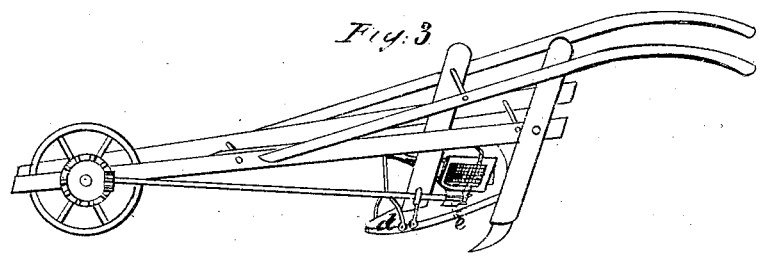

In the accompanying sheet of drawings, Figure 1 is a detached side view of my invention; Fig. 2, a transverse section of the same, taken in the line $x\ x$, Fig. 1; Fig. 3, a perspective view of the same applied to a cultivator-plow.

Similar letters of reference indicate like parts.

A represents a screen, of suitable dimensions, which is attached to a cultivator-plow, as shown in Fig. 3. To the upper edge of this screen there is attached, by hinges $a\ a$, plate B, said plate having curved or segment screws $a^x$ attached, which pass through the end pieces $b\ b$ of the screen-frame and have nuts $c$ upon them, by turning or adjusting which the plate B may have a greater or less degree of inclination relatively with the screen, as may be desired. This screen, as the machine is drawn along, is at the inner side of the row of plants, and the adjustable plate B at the opposite side, and the earth is thrown up from the shoe $d$ (see Fig. 3) upon the screen by a rotary winged shaft, $e$, driven from the front wheel, $f$, of the machine.

The screen A admits of fine soil only passing through it upon the plants, and the plate B prevents the soil being thrown beyond the plants, and by adjusting this plate B more or less fine soil may be thrown upon or around the plants, as may be desired.

To the lower rear end of the screen A a curved share, C, is attached, to prevent clods of earth from rolling upon the plants as the screen passes them. By this arrangement the plants are prevented from being injured by the throwing of clods of earth upon them, and a fine soil at the same time allowed to be thrown upon or around them. Various plans have been devised with a view to effect this result; but none, so far as I am aware, have proved to be successful, as the means employed for the purpose have prevented the fine soil as well as the clods from reaching the plants—a deficiency which is fully obviated by my invention.

Having thus described my invention, I claim as new and desire to secure by Letters Patent—

The screen A, in combination with the adjustable hinged plate B, applied to a cultivator-plow, to operate in the manner substantially as and for the purpose set forth.

G. BRAIN.

Witnesses:
JAS. L. TORBERT,
AMOS BARR.